United States Patent [19]

Johnson

[11] 3,974,742

[45] Aug. 17, 1976

[54] LOCK VALVE ASSEMBLY

[75] Inventor: Howard L. Johnson, Joliet, Ill.

[73] Assignee: Caterpillar Tractor Co., Peoria, Ill.

[22] Filed: Oct. 31, 1974

[21] Appl. No.: 519,567

[52] U.S. Cl. .................................... 91/420; 91/443; 91/445; 91/449; 91/452; 137/87; 137/110

[51] Int. Cl.² .................. F15B 11/08; F15B 13/042; G05D 11/02

[58] Field of Search ............. 91/6, 28, 29, 420, 449, 91/445, 443, 450, 463, 452; 137/110, 87, 106, 102

[56] References Cited

UNITED STATES PATENTS

| | | | |
|---|---|---|---|
| 2,506,008 | 5/1950 | Arps | 91/468 X |
| 2,588,520 | 3/1952 | Halgren et al. | 91/420 |
| 3,213,874 | 10/1965 | Schmiel et al. | 91/420 |
| 3,411,521 | 11/1968 | Johnson | 91/443 X |
| 3,434,448 | 3/1969 | Woodfill | 91/420 X |

*Primary Examiner*—Irwin C. Cohen
*Attorney, Agent, or Firm*—Oscar G. Pence

[57] ABSTRACT

A lock valve assembly is provided in a hydraulic control system for a double acting hydraulic jack which is adapted to permit the desired substantially unrestricted flow of inlet fluid selectively to either end of the jack under all operating conditions and is automatically self-conditioning to either restrict when necessary or not to restrict the flow of outlet fluid from either end of the jack as may be required.

11 Claims, 1 Drawing Figure

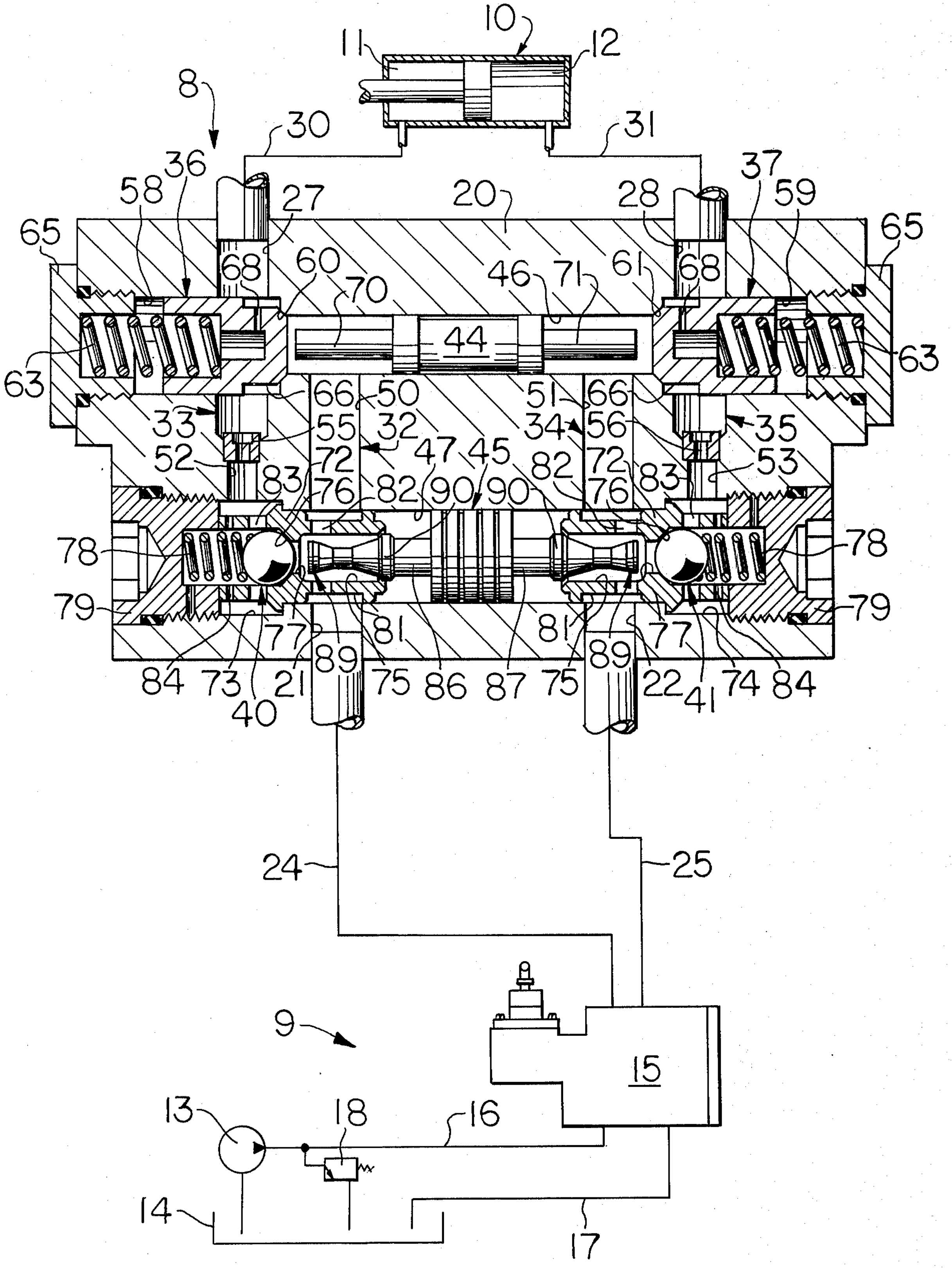
10
11
12
8
30
31
36
37
58
27
20
28
59
65
65
68
60
46
71
61
68
70
44
63
63
66
50
51
66
33
55
32
34
56
35
52
47
45
72
72
53
83
76
82
90
90
82
76
83
78
78
79
79
77
81
81
77
89
89
84
73
21
75
86
87
75
22
41
74
84
40
24
25
9
15
13
18
16
14
17

LOCK VALVE ASSEMBLY

BACKGROUND OF THE INVENTION

This invention relates to lock valves which are commonly used in hydraulic control circuits to prevent the leakage of fluid from fluid motors, such as hydraulic jacks and the like, due to the influence of external pressures or forces acting on the jacks.

Typical examples of prior art lock valve devices known to Applicant are disclosed in U.S. Pat. No. 2,691,964 to Stickney; U.S. Pat. No. 3,563,261 to Griffith et al; and U.S. Pat. No. 3,857,404 to Johnson, which patent is assigned to the Assignee of this application.

Many hydraulic systems employed, for example in earthmoving vehicles and the like, use double acting hydraulic jacks for adjusting various machine components and implements carried on such vehicles. It is well known in the art, that external forces or loads acting on such jacks through such machine components may create either a negative or a positive load condition. In this regard, the phrase—negative load condition—is meant to describe a condition where such external forces are oriented in a direction to assist inlet fluid pressure to the jack from the hydraulic system, as when lowering a load in the bucket of an end loader, and the phrase—positive load condition—is used to describe a condition where such external forces are oriented to oppose the inlet fluid pressure, as when raising a load.

In most circumstances, it is undesirable to restrict the flow of fluid to or from the jack, as such restriction causes the undesirable generation of heat and the build-up of back pressure in the system which consumes energy more beneficially used to perform other work functions desired of the vehicle. However, it is well known that a negative load condition can cause inlet fluid pressure to the jack to be reduced to a negative amount due to the load causing the jack to move faster than the system can supply fluid to it. This may cause cavitation on the inlet side of the jack and on the various other components of the hydraulic circuit which is equally undesirable.

Many prior art lock valves attempt to minimize such cavitation by modulation of their respective check valves used to prevent the aforementioned leakage so as to restrict fluid flow from the outlet side of the jack to prevent the jack from overrunning the fluid supply to its inlet side. However, due to the difficulties of modulating such check valves and the complex instability problems encountered, the prior art lock valve have not been completely successful in restricting outlet fluid to the minimum flow desired during negative load conditions without, in turn, having a certain amount of unnecessary restriction of fluid flow when maximum flow is desired during positive load conditions.

Thus the prior art lock valves only afford at best a poor compromise between the undesirable effects of cavitation and fluid flow restriction since any benefit gained on the one problem is attained at the expense of the other.

OBJECTS OF THE INVENTION

Accordingly, it is an object of the present invention to provide an improved lock valve assembly which is adapted to be automatically self-conditioning to provide the optimum fluid flow to and from the opposite ends of the double-acting hydraulic jack.

Another object of the present invention is to provide such an improved lock valve assembly which is capable of attaining such optimum performance without sacrificing one desired function at the expense of another in order to meet changing flow and pressure requirements of the hydraulic system in which it is disposed due to the influence of external loads acting on the jack during operation.

Another object of this invention is to provide such an improved lock valve assembly which is capable of permitting substantially unrestricted flow of both inlet and outlet fluid at the opposite ends of the jack during a positive loading condition.

Another object of this invention is to provide a lock valve assembly which is further capable of effectively restricting the flow of outlet fluid during a negative load condition so as to prevent cavitation and jack overrunning, while still permitting unrestricted flow of inlet fluid under said condition.

Other objects and advantages of the present invention will become more readily apparent upon reference to the accompanying drawing and following description.

BRIEF DESCRIPTION OF THE DRAWING

The drawing is a cross-sectional view of a lock valve assembly embodying the principles of the present invention which is shown in combination with a fluid circuit and a hydraulic jack shown schematically.

DESCRIPTION OF THE PREFERRED EMBODIMENT

Referring more particularly to the drawing, a lock valve assembly embodying the principles of the present invention is generally indicated at 8 in association with a fluid circuit 9 for actuation of a double acting hydraulic jack 10 having opposite rod and head ends 11 and 12, respectively.

The fluid circuit 11 includes a pump 13 which is adapted to draw fluid from a tank 14 for supplying pressurized fluid to a manually actuatable, spool-type control valve 15 through a conduit 16. Fluid is exhausted from the control valve to the tank through a conduit 17. A relief valve 18 is interposed the conduit 16 and the tank 14 for relieving excessive pressures in the fluid circuit in a normal manner.

The control valve 15 is manually actuatable from a neutral or hold position in which it is shown to either a first operative position to direct inlet fluid pressure from the pump 13 to the rod end 11 of the jack 10, while simultaneously receiving outlet fluid from its head end 12, or to a second operative position wherein inlet fluid is directed to the head end of the jack and outlet fluid is received from its rod end.

In a manner to be subsequently described, the lock valve assembly 8 is adapted to permit substantially unrestricted flow of such inlet fluid pressure therethrough to either of the ends of the jack 10 under any loading condition experienced during operation while permitting substantially unrestricted flow of outlet fluid pressure from such ends during positive loading conditions and restricting such outlet fluid pressure during negative loading conditions.

To accomplish this, the lock valve assembly 8 includes a valve body 20 having a pair of left and right hand service ports 21 and 22 which are individually connected to the control valve 15 by a pair of conduits 24 and 25, respectively, and a pair of left and right hand motor ports 27 and 28 which are individually connected to the opposite ends of the jack 10 by a pair of conduits 30 and 31, respectively. Communication of fluid through the valve body 20 between the left hand service and motor ports 21 and 27 is provided by a pair of separate high and low flow paths 32 and 33 and between the right hand service and motor ports 22 and 28 by a similar pair of separate high and low rate flow paths 34 and 35.

To prevent leakage of fluid from the opposite ends of the jack due to the influence of external forces acting thereon when the control valve 15 is in its neutral position, each of the flow paths is provided with a check valve device, with the high rate flow paths 32 and 34 being provided with similar relatively large poppet-type check valves 36 and 37 and the low rate flow paths 33 and 35 being provided with substantially smaller ball-type check valves 40 and 41, respectively.

The check valves are situated in their respective flow paths so as to be opened by inlet fluid pressure through the valve assembly to the jack 12, but block outlet fluid therefrom. A pair of actuator pistons 44 and 45 are individually disposed between the poppet valves 36 and 37 and the ball check valves 40 and 41 for unseating the same to allow outlet fluid through the valve assembly to permit adjustment of the jack.

To make the check valve assembly 8 self-conditioning to control the flow of outlet fluid therethrough to meet the changing flow and pressure requirements due to the various loading conditions affecting the jack during operation, the actuator piston 45 is provided with a substantially larger effective area than its ball check valves 40 and 41 to insure that such valves are unseated by the actuator piston during any operating condition. In particular, a ratio of 5 to 1 between the areas of the actuator piston 45 and the ball check valves 40 and 41 has been found to be satisfactory for this purpose. In contrast thereto, the actuator piston 44 is provided with an area which is approximately equal to or slightly less than the area of its respective poppet valves 36 and 37 so that the force of inlet fluid pressure there-against is sufficient to open such poppet valves under a positive loading condition, but will be insufficient to open the poppet valves under conditions where the outlet pressure is greater than such inlet pressure as during a negative loading condition. In particular, a ratio of 0.9 to 1 between the areas of the actuator piston 44 and the poppet valves 36 and 37 has been found to be satisfactory for this purpose.

In the preferred embodiment of the lock valve assembly 10, the valve body 20 includes a pair of elongated, substantially parallel spaced bores 46 and 47 for reciprocably mounting their respective actuator pistons 44 and 45.

The high rate flow paths 32 and 34 individually include one of a first pair of passages 50 and 51 which transversely intersect with the bores 46 and 47 on opposite sides of the actuator pistons 44 and 45, respectively.

The low rate flow paths 33 and 35 individually include one of a second pair of passages 52 and 53 which also transversely intersect with the bores 46 and 47, but in outwardly spaced relation to the first pair of passages 50 and 51. A pair of fixed size orifices 55 and 56 are individually disposed within the outer passages 52 and 53, respectively, for restricting the flow of fluid through the low rate flow paths 33 and 35.

The poppet valves 36 and 37 are individually reciprocably mounted within a portion of the high rate flow path defined by opposite end portions 58 and 59 of the bore 46. Each end portion individually defines one of a pair of tapered annular valve seats 60 and 61. Such valve seats are individually disposed intermediate their respective right and left hand passages 50, 52 and 51, 53. The poppet valves are individually urged inwardly against valve seats 60 and 61 by a pair of springs 63 which are disposed between their respective poppet valves and a corresponding one of a pair of plugs 65 closing the opposite ends of the bore 46. Each poppet valve 36 and 37 is provided with an annular recess 66 for communicating fluid between the left and right hand outer passages 52 and 53 to the corresponding left and right hand motor ports 27 and 28. A vent passage 68 is also provided in each of the poppet valves to prevent a hydraulic block from occurring between such valves and their respective plugs and to admit outlet fluid pressure therebetween for purposes hereinafter described.

The actuator piston 44 is provided with a pair of reduced diameter rod members 70 and 71 projecting from its opposite ends which are adapted to engage and unseat their corresponding poppet valves 36 and 37.

Each of the ball check valves 40 and 41 are individually reciprocably mounted in one of a pair of elongated annular, diameter reducing sleeve members 72 which are individually engaged within a portion of a low rate flow paths 33 and 35 defined by opposite end portions 73 and 74 of the lower bore 47. The sleeve members 72 are provided with a stepped bore 75 defining an annular valve seat portion 76 and a relatively small restricted bore 77 thereadjacent. The ball check vales 40 and 41 are urged inwardly against their corresponding valve seats 76 by a pair of compression springs 78 disposed between such ball check valves and one of a pair of plugs 79 for closing the opposite ends of the bore 47. The sleeve members 72 extend inwardly past the inner passages 50 and 51, respectively, and are provided with an annular recess 81 for providing unrestricted communication of fluid around the sleeve members between the service ports 21 and 22 and the inner passages 50 and 51, respectively.

A first plurality of radial passages 82 are provided through the inner ends of the sleeve member 72 to communicate fluid from the service ports with the stepped bore 75. A second plurality of radial passages 83 are provided through the outer ends of the sleeve members to communicate fluid from the stepped bore 75 to the outer passages 52 and 53. A pair of vent passages 84 are also provided in the outer ends of the sleeve members to prevent a hydraulic block from occurring between the ball check valves 40 and 41 and their respective plugs 79.

The actuator piston 45 in the lower bore 47 is, like the upper actuator piston 44, provided with a pair of reduced diameter rod members 86 and 87 for engaging and unseating their respective ball check valves 40 and 41 upon axial movement of the piston in an appropriate direction. Each rod member terminates in a tapered valve head portion 89. Such valve head portions are adapted to be received within their respective restricted bores 77 of the sleeve members 72 to provide varying radial clearances therebetween dependent upon the relative axial positions of the valve head in the bore for controlling the flow of fluid therethrough for metering purposes. The rod members 86 and 87 also include an enlarged diameter cushioning piston 90. Such pistons are adapted for sliding movement within the adjacent ends of bores 75 on the sleeve members 72 with a relatively small radial clearance therebetween for dampening purposes. It should be noted that the piston 45 and sleeve members 72, as well as ball check valves 40 and 41 are essentially identical to those shown and more fully described in the earlier mentioned application Ser. No. 355,473 and function in substantially the same manner.

OPERATION

While the operation of the present invention is believed to be clearly apparent from the foregoing description, further amplification will be made in the following brief summary of such operation. If the control valve 15 is actuated to its first operative position to direct inlet fluid pressure to the left hand high and low rate flow paths 32 and 33 through the conduit 24, the force exerted by such pressure is effective in unseating both the left hand poppet check valve 36 and the ball check valve 40 to permit communication of the inlet fluid to the rod end 11 of the jack 10 through the conduit 30. Due to the restriction provided by the restricted bore 77 of the sleeve member 72 and the orifice 55 in the low rate flow path 33, most of such inlet fluid will be conducted through the high rate flow path 32. It will be appreciated that this results in a substantially smaller pressure loss than would have been possible if such inlet fluid were conducted solely through a single, relatively lower rate flow path similar to those used in many prior art lock valves. In addition to opening the poppet and ball check valves 36 and 40, the force of the inlet fluid pressure is also exerted against the adjacent ends of the actuator pistons 44 and 45 to move such pistons rightwardly in their respective bores 46 and 47.

The force exerted by the inlet fluid pressure conducted to the rod end 11 of the jack 10 causes the retraction of such jack and the exhausting of outlet fluid from its head end 12. Such outlet fluid is conducted through the conduit 31 to the right hand motor port 28. The outlet fluid is then communicated through the passage 68 in poppet valve 37 to act against its right hand end to urge its closure against its valve seat 61. Outlet fluid is also communicated around the poppet valve by the recess 66 and through passages 53 and 83 to act against the right hand side of the ball check valve 41 to urge its closure against its valve seat 76. This initially prevents the exhausting of the outlet fluid to the tank 14 through service port 22, conduits 25 and 17 and control valve 15.

If an external load is pulling leftward on the rod of the jack in the above situation, the opposition of such external load to inlet fluid pressure to the rod end of the jack will result in a positive loading condition, wherein such inlet pressure is greater than outlet pressure from the head end of the jack. Consequently, the effect of inlet fluid pressure against the actuator pistons 44 and 45 produces an opening force reacting on the poppet and ball check valves 37 and 41 through rod members 71 and 87, respectively, which is greater than the closing force acting thereupon in the opposite direction afforded by outlet fluid pressure. This causes the unseating of such check valves to permit the substantially unrestricted exhausting of the outlet fluid through both the high and low rate flow paths 34 and 35.

However, if the above external load is oriented in the opposite direction, a negative loading condition will result, wherein inlet fluid pressure will be less than outlet fluid pressure due to the assisting force of the external load. Because the actuator piston 44 is provided with a cross sectional area which is slightly less than the effective surface area of the poppet valve 37, as mentioned earlier, the force of the actuator piston produced by inlet pressure and acting against the poppet valve will be insufficient to unseat the poppet valve due to the substantially greater closing force acting thereon afforded by outlet fluid pressure. Consequently, the poppet valve will remain closed and prevent the exhausting of the outlet fluid through the high rate flow path 34. While the cross sectional area of the lower actuator piston 45 is substantially larger than the effective surface area of the ball check valve 41, as mentioned earlier, the magnitude of the force of the piston being exerted against the ball check to open it is somewhat offset by the proportionately greater closing force afforded by the outlet fluid pressure. This tends to limit the opening of the ball check valve 41 so that the valve head portion 89 of the rod member 87 will be disposed within the bore 77 of the sleeve member 72 instead of through it, as during a positive condition, to restrict flow there-through. Consequently, the fluid metering provided by the fixed orifice 56 in passage 53, in conjunction with the variable metering effect provided by the valve head portion 89 within bore 77 is effective in sufficiently restricting outlet fluid flow through the lock valve assembly 8 to prevent cavitation and jack overrunning.

As the left and right hand sides of the lock valve assembly 8 are essentially symetrically constructed, the operation of such valve assembly is identical to that just described when the control valve 15 is actuated to its second operative position, but with the operation of the left hand components being the reverse of the corresponding components on the right hand side.

Thus it is apparent from the foregoing that the construction of the present lock valve assembly 8 fully satisfies the objects of the present invention by providing such lock valve assembly with a pair of separate high and low rate flow paths to the opposite ends of a hydraulic jack wherein both of such paths are used to conduct inlet fluid pressure to the jack in a substantially unrestricted manner under any operating condition and wherein either the low rate flow path or both the high and low rate flow paths are selectively chosen to conduct outlet fluid from the jack depending upon the external load conditions affecting the jack.

In particular, the lock valve assembly is adapted to be automatically self-conditioning to select the low rate flow path during a negative load condition and to select both the high and low rate flow paths during a positive load condition. This allows the low rate flow path to be sized sufficiently small to effectively restrict outlet fluid to a minimum flow under maximum back pressure conditions to prevent the undesired cavitation without the attendant complex metering and stability problems commonly encountered when attempting to accommodate both maximum and minimum flow rates through a single passage. It also allows the high rate flow path to be sized sufficiently large so that the maximum flow rate encountered during operation can be accomodated through both the high and low rate flow paths without unduly restricting such flow to minimize the back pressure in the hydraulic circuit and substantially eliminate any undesirable generation of heat.

While the present invention has been described and shown with particular reference to the preferred embodiment, it will be apparent that variations might be possible that would fall within the scope of the present invention, which is not intended to be limited except as defined in the following claims.

The embodiments of the invention in which an exclusive property or privilege is claimed are defined as follows:

1. A lock valve assembly, for use in combination with a fluid circuit including a double acting hydraulic jack and a control valve for selectively directing fluid pressure to the opposite ends of such jack, comprising:

a valve body having first and second passage means formed therethrough for individually providing connection between the opposite ends of said jack and such control valve, said first passage means having a pair of separate high and low flow paths therein;

first and second check valve means disposed within said high and low rate flow paths, respectively, of said first passage means for normally blocking outlet fluid from said jack through such paths, each of said first and second check valve means being provided with a respective predetermined effective pressure responsive area exposed to outlet fluid from the jack for exerting an outlet fluid pressure responsive closing force on said first and second check valve means corresponding to their respective areas;

first and second actuator means responsive to inlet fluid pressure in said second passage means of the valve body, said second actuator means having an effective pressure responsive area open to inlet fluid pressure in said passage means greater than the said predetermined effective pressure responsive area of the second check valve means, said first actuator means having an effective pressure responsive area open to inlet fluid pressure in said second passage means less than the said predetermined effective pressure responsive area of first check valve means, said second actuator means being operative to exert an opening force on said second check valve means sufficient to overcome said closing force thereon when a predetermined positive inlet pressure exists in said second passage means so as to permit the exhausting of outlet fluid through said low rate flow path, and said first actuator means being operative to exert an opening force on said first check valve means sufficient to overcome said closing force thereon only when the inlet pressure exceeds the outlet pressure exerting said closing force thereon so as to permit the exhausting of outlet fluid through said high rate flow path.

2. The lock valve assembly of claim 1 wherein said second passage means is provided with separate high and low rate flow paths similar to the high and low rate flow paths of said first passage means and including third and fourth check valve means respectively disposed therein for normally blocking outlet fluid from said jack through their respective paths, each of said third and fourth check valve means being provided with a respective predetermined effective pressure responsive area exposed to outlet fluid from the jack for exerting an outlet fluid pressure responsive closing force on said third and fourth check valve means corresponding to their respective areas;

and wherein said first and second actuator means are also responsive to inlet fluid pressure in said first passage means of the valve body, said second actuator means having an effective pressure responsive area open to inlet fluid pressure in said first passage means greater than the said predetermined effective pressure responsive area of the fourth check valve means, said first actuator means having an effective pressure responsive area open to inlet pressure in said first passage means less than the said predetermined effective pressure responsive area of the third check valve means, said second actuator means being operative to exert an opening force on said fourth check valve means sufficient to overcome its closing force when a predetermined positive inlet pressure exists in the first passage means so as to permit the exhausting of outlet fluid through said low rate flow path, and said first actuator means being operative to exert an opening force on the third check valve means sufficient to overcome its closing force only when the inlet pressure exceeds the outlet pressure exerting said closing force thereon so as to permit the exhausting of outlet fluid through said high rate flow path.

3. The lock valve assembly of claim 2 including;

a first bore in said valve body having a pair of longitudinally spaced opposite end portions individually forming portions of said high rate flow paths, with said first and third check valve means being individually centrally disposed within such end portions;

a second bore in said valve body having a pair of longitudinally spaced opposite end portions individually forming portions of said low rate flow paths, with said second and fourth check valve means being individually centrally disposed within such end portions;

said first actuator means including a first actuator piston reciprocably mounted within said first bore in longitudinally spaced relation intermediate said opposite end portions thereof, said first piston having a pair of reduced diameter rod members extending coaxially from its opposite ends, which rod members are adapted for unseating engagement with a respective one of said first and third check valve means upon the appropriate axial movement of said piston within its bore; and said second actuator means including a second actuator piston reciprocably mounted within said second bore in longitudinally spaced relation intermediate said opposite end portions thereof, said second piston having a pair of reduced diameter rod members extending coaxially from its opposite ends, which rod members are adapted for unseating engagement with a respective one of said second and fourth check valve means upon the appropriate axial movement of said piston within its bore.

4. The lock valve assembly of claim 3 wherein each of said high rate flow paths individually includes;

one of a pair of first and second passages for individually connecting said control valve with a respective one of said end portions of said high rate flow paths in said first bore at longitudinally spaced positions inwardly of their respective first and third check valve means and outwardly of the adjacent end of said first actuator piston; and passage means for individually connecting the opposite ends of said jack with a respective one of said opposite end portions of said high rate flow paths in said first bore at longitudinally spaced positions outwardly of their respective first and third check valve means.

5. The lock valve assembly of claim 4 wherein each of said low rate flow paths individually includes;

one of a pair of third and fourth passages in said valve body for individually connecting the opposite ends of said jack with the opposite end portions of said low rate flow paths in said second bore at longitudinally spaced positions outwardly of their respective second and fourth check valve means, said third and fourth passages having orifice means disposed therein for substantially restricting fluid flow therethrough; and passage means for individually connecting said control valve with said opposite end portions of said low rate flow paths in said second bore at longitudinally spaced positions inwardly of their respective check valve means and outwardly of their respective adjacent ends of said second actuator piston.

6. The lock valve assembly of claim 5 wherein each of said first and third check valve means includes;

one of a pair of annular valve seats individually disposed within the opposite end portions of said first bore intermediate their corresponding passage means and a respective one of said first and second passages of said high rate flow paths;

one of a pair of relatively large poppet check valves biased by spring means reciprocably mounted within a respective one of the opposite end portions of said first bore and defining said predetermined areas of each of said check valve means; and means communicating said areas with its corresponding end of said jack for urging said poppet check valves inwardly in seating engagement against their respective valve seats.

7. The lock valve assembly of claim 6 wherein each of said second and fourth check valve means of said low rate flow paths include;

one of a pair of elongated, diameter reducing sleeve members secured within the respective opposite end portions of said second bore, each sleeve member having a restricted bore and an annular valve seat outwardly adjacent said restricted bore;

one of a pair of relatively small ball check valves reciprocably mounted within said sleeve members outwardly of their respective valve seats and defining said predetermined areas of each of said check valve means;

and means for communicating said areas with its corresponding end of the jack for urging said ball check valves inwardly against their respective valve seats.

8. The lock valve assembly of claim 7 wherein the opposite ends of said first actuator piston are each provided with a fluid surface area which is approximately 0.9 times the predetermined surface areas of said poppet check valves.

9. The lock valve assembly of claim 8 wherein the opposite ends of said second actuator piston are provided with a fluid surface area which is approximately 5 times greater than said given relatively small effective surface areas of said ball check valves.

10. The lock valve assembly of claim 9 wherein said reduced diameter rod members of said second actuator piston terminate in tapered valve head means which are axially variably positionable within said restricted bores of said sleeve members of said second and fourth check valve means for selectively variably metering fluid flow through such check valve means which, in conjunction with said orifice means of said third and fourth passages of said low rate flow paths, is effective in restricting fluid flow from said jack so as to prevent cavitation on the inlet side of the jack.

11. A lock valve assembly for controlling the flow of pressurized fluid therethrough comprising;

a valve body having a pair of service ports and a pair of motor ports;

a first pair of separate high and low rate flow paths in said valve body individually interconnecting one of said pair of service ports to one of said of pair motor ports;

a second pair of separate high and low rate flow paths in said valve body individually interconnecting the other of said service ports to the other of said motor ports;

a first bore in said valve body having a pair of longitudinally spaced opposite end portions defining portions of each of said high rate flow paths;

a second bore in said valve body having a pair of longitudinally spaced opposite end portions defining portions of each of said low rate flow paths;

a first pair of check valve means individually disposed within a respective one of said end portions of said first bore, said check valve means being provided with a given relatively large effective fluid surface area exposed to fluid pressure from a corresponding one of said motor ports for exerting a closing force on said check valve means to normally block fluid flow from said ports through said high rate flow paths;

a second pair of check valve means individually disposed within a respective one of said end portions of said second bore, said check valve means being provided with a given relatively small effective surface area exposed to fluid pressure from a corresponding one of said motor ports for for exerting a closing force on such check valve means for normally blocking fluid from said motor ports through said low rate paths;

first actuator piston means reciprocably mounted within said first bore intermediate said first pair of check valve means, said piston means being operative in response to fluid pressure in one of said high rate flow paths from its corresponding service port for unseating the check valve means in the other of said high rate flow paths to permit fluid flow therethrough from its corresponding motor port, and said piston means being provided with an effective fluid surface area exposed to said fluid pressure from said service port which area is slightly less than said given surface area of said first pair of check valve means so that pressure from said service port must be greater than pressure from the opposite motor port before said check valve means in unseated by said actuator means; and second actuator piston means reciprocably mounted within said second bore intermediate said second pair of check valve means, said second piston means being operative in response to fluid pressure in either of said low rate flow paths from their corresponding service ports for exerting and opening force on the check valve means in the other of said low rate flow paths, and said piston means being provided with an effective fluid pressure surface area substantially larger than said given small effective surface areas of said second pair of check valve means so that the opening force of said second actuator piston means is greater than said closing force under maxiumum operating pressure differentials between said motor and service ports to insure the unseating of said second pair of check valve means.

* * * * *